(12) United States Patent
Hung

(10) Patent No.: US 6,216,642 B1
(45) Date of Patent: Apr. 17, 2001

(54) VERMIN-PROOF COVERING TO PROTECT THE HEAD OF A HORSE

(76) Inventor: Kuei-Yin Hung, No. 26, Kuang-Ming Rd., Taichung City (TW)

( * ) Notice: Subject to any disclaimer, the term of this patent is extended or adjusted under 35 U.S.C. 154(b) by 0 days.

(21) Appl. No.: 09/271,286

(22) Filed: Mar. 17, 1999

(51) Int. Cl.[7] .............................. A01K 13/00; B68C 5/00
(52) U.S. Cl. .............................................. 119/850; 54/80.2
(58) Field of Search .................................... 119/823, 827, 119/831, 836, 837, 850; 54/10, 11, 80.1, 80.2

(56) References Cited

U.S. PATENT DOCUMENTS

| | | | |
|---|---|---|---|
| 584,947 | * | 6/1897 | Lungborg .............................. 119/836 |
| 2,407,029 | * | 9/1946 | Miller ................................... 119/850 |
| 3,753,334 | * | 8/1973 | Blessing ............................... 119/850 |
| 5,163,272 | * | 11/1992 | Finley et al. ........................ 54/80.1 |
| 5,345,751 | * | 9/1994 | Edwards .............................. 54/80.2 |
| 5,440,864 | * | 8/1995 | Green .................................. 54/80.2 |
| 6,050,068 | * | 4/2000 | White, Jr. ............................ 54/80.2 |

\* cited by examiner

Primary Examiner—Charles T. Jordan
Assistant Examiner—Elizabeth Shaw
(74) Attorney, Agent, or Firm—Charles E. Baxley

(57) ABSTRACT

A vermin-proof covering made from silk fabrics and adapted for covering on the head of a horse for protection against vermin, the covering including a body, the body having two insertion holes near a top side thereof corresponding to the ears of the horse, two longitudinally extended folded lines respectively downwardly extended from the insertion holes, two convex portions respectively formed around bottom ends of the folded longitudinal lines corresponding to the eyes of the horse, a transversely extended folded line formed between the insertion holes, and an arched portion formed at a top side thereof above the transversely extended folded line corresponding to the poll of the horse, hook and loop materials fixedly fastened to the body in two corners thereof and adapted to secure the body to the head of the horse; and two conical caps respectively stitched to the body around the insertion holes and adapted to receive the ears of the horse.

5 Claims, 5 Drawing Sheets

(12) United States Patent

VERMIN-PROOF COVERING TO PROTECT THE HEAD OF A HORSE

BACKGROUND OF THE INVENTION

The present invention relates to a vermin-proof covering for horse, and more particularly to such a vermin-proof covering that can be conveniently fastened to the head of a horse to protect the eyes and ears of the horse against vermin.

Horse riding is a kind of recreational or sports activity. Horses can also be used for pulling streetcars for transporting passengers. However, when a horse running or staying outdoors, vermin may fly to the eyes or the inside of the ears of the horse, causing the horse irritated. When a horse is irritated, it may stand up, jump, or shake the head severely, causing the rider to fall to the ground. Therefore, protective means is required for protecting the eyes and ears of the horse against vermin.

SUMMARY OF THE INVENTION

It is the main object of the present invention to provide a vermin-proof covering for horse which can be effectively protect the eyes and ears of the horse against vermin, without stopping the horse from seeing to the outside. It is another object of the present invention to provide a vermin-proof covering for horse which can be conveniently fastened to the head of the horse and adjusted.

DETAILED DESCRIPTION OF THE PREFERRED EMBODIMENT

Figure 1:
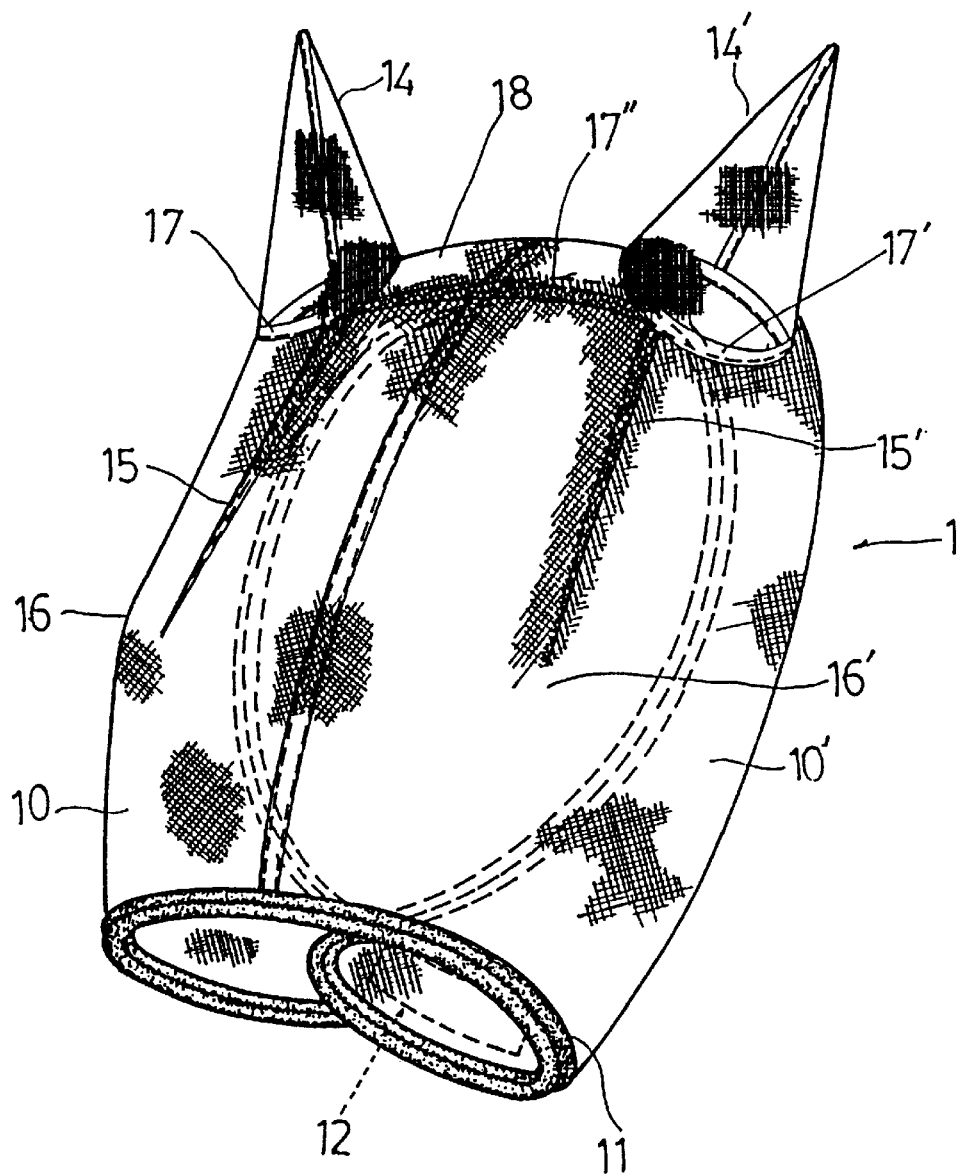
FIG. 1 is a perspective front view of a vermin-proof covering according to the present invention.
Figure 2:
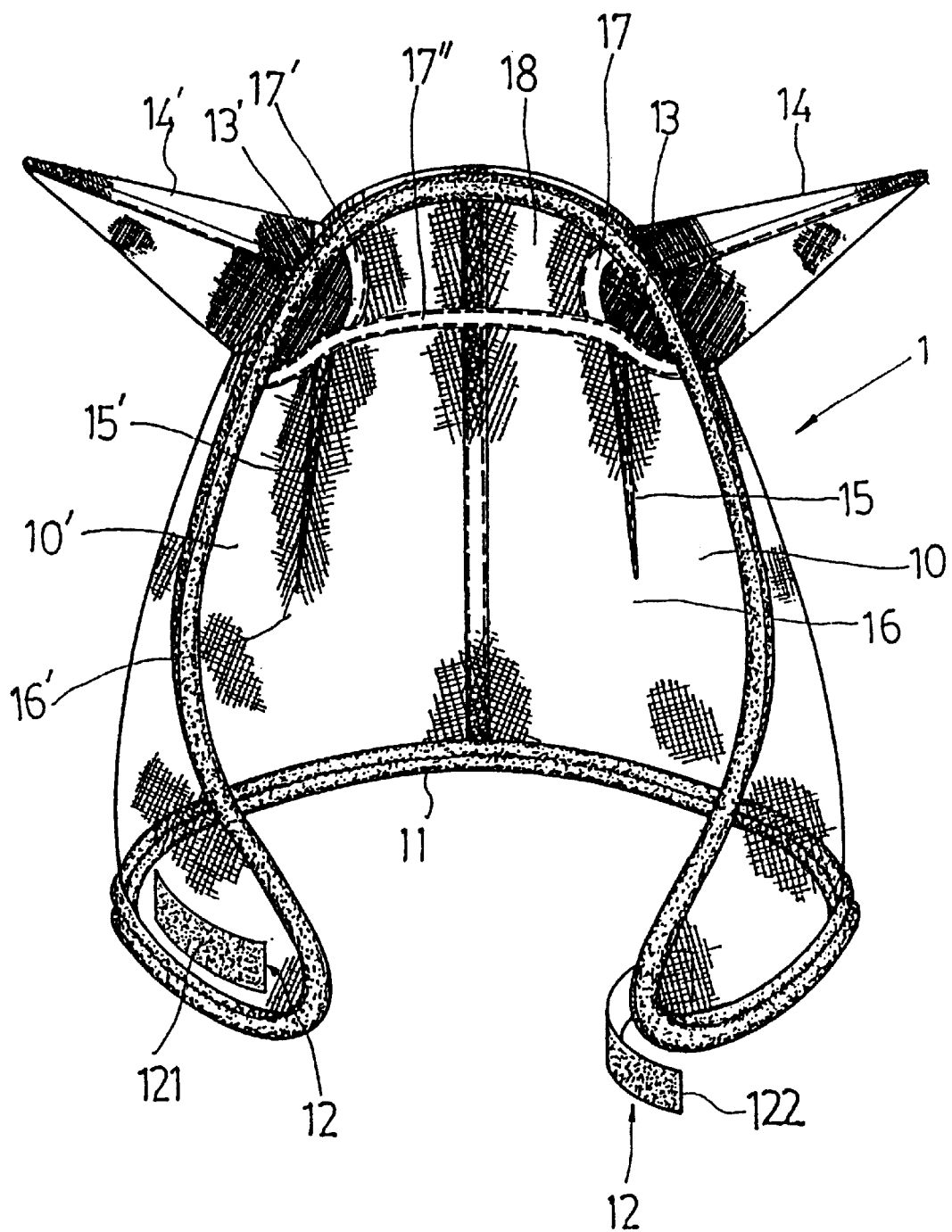
FIG. 2 is a perspective rear side view of the vermin-proof covering shown in FIG. 1.
Figure 3:
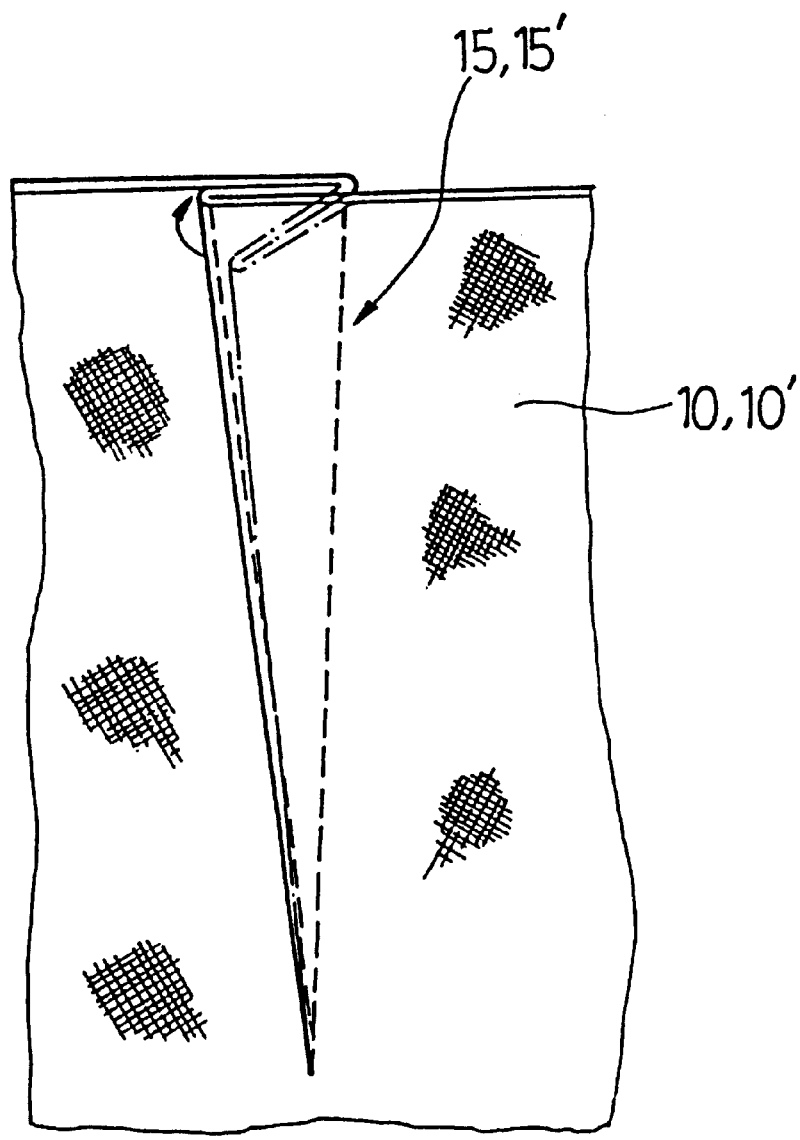
FIG. 3 is a schematic drawing showing the stitching of the longitudinally extended folded lines on the face panels according to the present invention.

Referring to FIGS. from 1 to 3, the body 1 of a vermin-proof covering according to the present invention is made from silk fabrics comprised of two substantially right-angled triangle face panels 10;10' stitched together. The border of the body 1 is stitched with a strip of wool fabric to form a hem 11. A fastening device 12 is provided for securing the body of the vermin-proof covering 1 to the horse's head. The fastening device 12 is comprised of a hook tape 121 and a loop tape 122. The hook tape 121 is fixedly and obliquely fastened to one face panel 10' in one corner at an outer side. The loop tape 122 has one end fixedly fastened to the other face panel 10 in one corner at an inner side corresponding to the hook tape 121. The other end of the loop tape 122 is a free end.

Two insertion holes 13;13' are respectively provided at the face panels 10;10' corresponding to the ears of the horse. Two conical ear-protection caps 14;14' are respectively fastened to the border areas of the insertion holes 13;13', and adapted to receive the horse's ears. Two longitudinally extended folded lines 15;15' are respectively provided at the face panels 10;10', and downwardly extended from the border areas of the insertion holes 13;13'. The width of the folded lines 15;15' gradually reduces from the insertion holes 13;13' toward the end, therefore two convex portions 16;16' are formed at the face panels 13;13' corresponding to the horse's eyes. A transversely extended folded line is formed between the insertion holes 13;13', so that an arched portion 18 is formed at the top side corresponding to the horse's poll. Soft edges 17;17';17" are provided at the connection areas between the insertion holes 13;13' and the ear-protection caps 14;14' and the bottom side of the arched portion 18 between the insertion holes 13;13'.

Figure 4A:
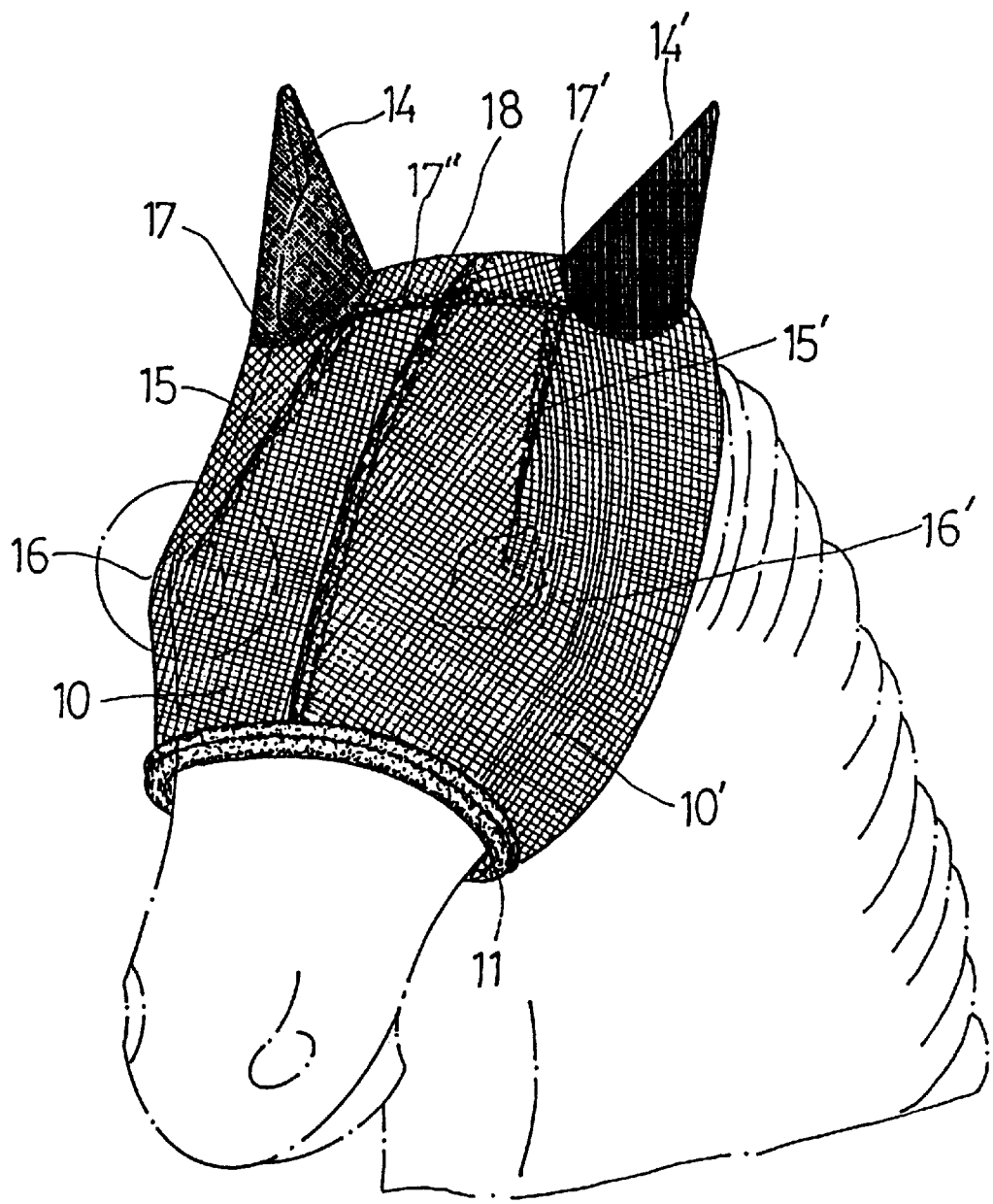
FIG. 4A is an applied view of the present invention, showing the vermin-proof covering covered on the head of the horse.
Figure 4B:
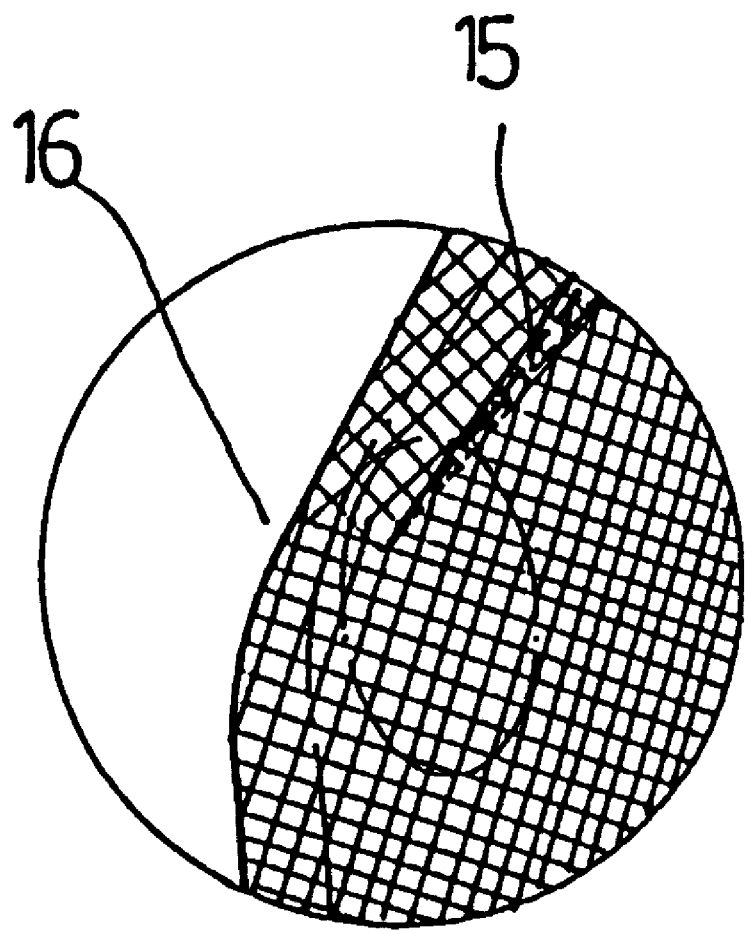
FIG. 4B is an enlarged view of a part of FIG. 4A.

Referring to FIGS. 4A and 4B, when the vermin-proof covering is covered on the horse's head, the hook tape 121 and the loop tape 122 are fastened together to secure the vermin-proof covering to the horse's head, permitting the horse's ears to be respective received in the ear-protection caps 14;14', the arched portion 18 to be covered over the horse's poll, the convex portions 16;16' to be covered over the horse's eyes and spaced from the horse's eyes at a distance without stopping the horse's eyes from seeing to the outside. Because the soft hem 11 and the soft edges 17;17';17" are disposed in close contact with the horse's head and areas around the horse's ears, the horse does not feel uncomfortable. When the horse runs or stays outdoors, vermin and micro substance are prohibited from passing to the horse's ears or the inside of the horse's ears.

What the invention claimed is:

1. A vermin-proof covering made from silk fabrics and adapted for covering on a horse's head to protect against vermin, comprising:

a body having two insertion holes near a top side thereof corresponding to the ears of the horse, two longitudinally extended folded lines respectively downwardly extended from said insertion holes, two convex portions respectively formed around bottom ends of said folded longitudinal lines corresponding to the eyes of the horse, a transversely extended folded line formed between said insertion holes, and an arched portion formed at a top side thereof above said transversely extended folded line corresponding to the poll of the horse, said body including a first right-angled triangle face panel and a second right-angled triangle face panel stitched together;

fastening tape means fixedly fastened to said body in two corners thereof and adapted to secure said body to the head of the horse; and two conical caps stitched to said body around said insertion holes and adapted to receive the ears of the horse.

2. The vermin-proof covering of claim 1, wherein the border area of said body is stitched with a hem.

3. The vermin-proof covering of claim 1, wherein said fastening tape means is comprised of a hook tape fixedly and obliquely fastened to said first right-angled triangle face panel in one corner at an outer side, and a loop tape having a fixed end fixedly fastened to said second right-angled triangle face panel in one corner at an inner side and a free end for securing to said hook tape on said first right-angled triangle face panel.

4. The vermin-proof covering of claim 1, wherein said longitudinally extended folded lines of said body have a width gradually reducing from said insertion holes toward the ends.

5. The vermin-proof covering of claim 1, wherein soft edges are provided at the connection areas between said insertion holes and said ear-protection caps and a bottom side of said arched portion between said insertion holes.

\* \* \* \* \*